United States Patent
Yuet et al.

(10) Patent No.: US 8,332,106 B2
(45) Date of Patent: Dec. 11, 2012

(54) TETHER TRACKING SYSTEM AND METHOD FOR MOBILE MACHINE

(75) Inventors: Fu Pei Yuet, Peoria, IL (US);
Jean-Jacques Clar, Edelstein, IL (US);
Martin Politick, Laval (CA)

(73) Assignee: Caterpillar Inc., Peoria, IL (US)

( * ) Notice: Subject to any disclaimer, the term of this patent is extended or adjusted under 35 U.S.C. 154(b) by 649 days.

(21) Appl. No.: 12/603,293

(22) Filed: Oct. 21, 2009

(65) Prior Publication Data
US 2011/0093170 A1    Apr. 21, 2011

(51) Int. Cl.
*G06F 19/00* (2006.01)
(52) U.S. Cl. ......................................................... 701/50
(58) Field of Classification Search .................... 701/50, 701/400, 408, 1
See application file for complete search history.

(56) References Cited

U.S. PATENT DOCUMENTS

| | | | |
|---|---|---|---|
| 429,104 | A | 5/1890 | Witthaus |
| 2,471,312 | A | 5/1949 | Corbliss |
| 2,483,050 | A | 9/1949 | Hinchon |
| 3,533,483 | A | 10/1970 | Ballinger |
| 3,695,377 | A | 10/1972 | Ito et al. |
| 3,863,741 | A | 2/1975 | Mitsuishi et al. |
| 3,943,306 | A | 3/1976 | Aihara et al. |
| 4,071,124 | A | 1/1978 | Price |
| 4,108,264 | A | 8/1978 | Tanaka |
| 4,119,908 | A | 10/1978 | Cosman et al. |
| 4,260,191 | A | 4/1981 | Weber |
| 4,423,852 | A | 1/1984 | Conroy et al. |
| 4,440,091 | A | 4/1984 | Burgess |
| 4,511,100 | A | 4/1985 | Oetringhaus |
| 4,587,383 | A | 5/1986 | Stoldt |
| 4,862,088 | A | 8/1989 | Etienne et al. |
| 5,028,149 | A | 7/1991 | Hardtke |
| 5,170,352 | A | 12/1992 | McTamaney et al. |
| 5,299,130 | A | 3/1994 | Ono |
| 5,361,756 | A | 11/1994 | Cernosek et al. |
| 5,498,940 | A | 3/1996 | Kim et al. |
| 5,587,929 | A | 12/1996 | League et al. |

(Continued)

FOREIGN PATENT DOCUMENTS
WO    9422706    10/1994

OTHER PUBLICATIONS

U.S. Appl. No. 12/149,233 of Roger Dale Koch et al., filed Apr. 29, 2008.

(Continued)

*Primary Examiner* — Yonel Beaulieu
(74) *Attorney, Agent, or Firm* — Finnegan, Henderson, Farabow, Garrett & Dunner LLP (57) ABSTRACT

A tether tracking system for a mobile machine is disclosed. The tether tracking system may have a spool located on the mobile machine to selectively dispense and reel in a tether extending from the mobile machine to a stationary source as the mobile machine travels about a worksite. The tether tracking system may also have at least one sensor associated with the spool to generate a first signal indicative of a spool parameter, a locating system associated with the mobile machine to generate a second signal indicative of a location of the mobile machine, and a controller in communication with the at least one sensor and the locating system. The controller may be configured to determine a tether avoidance zone based on the first and second signals.

20 Claims, 3 Drawing Sheets

U.S. PATENT DOCUMENTS

| | | | |
|---|---|---|---|
| 5,612,883 A | 3/1997 | Shaffer et al. | |
| 5,646,845 A | 7/1997 | Gudat et al. | |
| 5,740,994 A | 4/1998 | Laughlin | |
| 5,779,198 A | 7/1998 | Rutherford et al. | |
| 5,822,891 A | 10/1998 | Fujishima et al. | |
| 5,928,309 A | 7/1999 | Korver et al. | |
| 6,058,344 A | 5/2000 | Rowe et al. | |
| 6,064,926 A | 5/2000 | Sarangapani et al. | |
| 6,113,343 A | 9/2000 | Goldenberg et al. | |
| 6,271,667 B1 | 8/2001 | Minarovic | |
| 6,336,051 B1 | 1/2002 | Pangels et al. | |
| 6,361,000 B1 | 3/2002 | Jette | |
| 6,363,632 B1 | 4/2002 | Stentz et al. | |
| 6,557,943 B2 | 5/2003 | Ando | |
| 6,595,464 B2 | 7/2003 | Peck | |
| 6,612,516 B1 | 9/2003 | Haines | |
| 6,678,394 B1 | 1/2004 | Nichani | |
| 6,711,838 B2 | 3/2004 | Staub et al. | |
| 7,007,899 B1 | 3/2006 | Bachman | |
| 7,009,399 B2 | 3/2006 | Olsson et al. | |
| 7,010,425 B2 | 3/2006 | Gray et al. | |
| 7,092,075 B2 | 8/2006 | Singh et al. | |
| 7,181,370 B2 | 2/2007 | Furem et al. | |
| 7,272,474 B1 | 9/2007 | Stentz et al. | |
| 7,331,436 B1 | 2/2008 | Pack et al. | |
| 8,024,066 B2 * | 9/2011 | Reverte et al. | 700/245 |
| 8,116,921 B2 * | 2/2012 | Ferrin et al. | 701/1 |
| 2002/0170399 A1 * | 11/2002 | Gass et al. | 83/62.1 |
| 2003/0113092 A1 | 6/2003 | Porter | |
| 2004/0210370 A1 | 10/2004 | Gudat et al. | |
| 2006/0085118 A1 | 4/2006 | Baldwin | |
| 2006/0232427 A1 | 10/2006 | Minarovic | |
| 2007/0150149 A1 | 6/2007 | Peterson et al. | |
| 2009/0012666 A1 * | 1/2009 | Simpson et al. | 701/23 |
| 2011/0202224 A1 * | 8/2011 | Thompson et al. | 701/26 |

OTHER PUBLICATIONS

U.S. Appl. No. 12/149,234 of Bryan James Everett et al., filed Apr. 29, 2008.

* cited by examiner

TETHER TRACKING SYSTEM AND METHOD FOR MOBILE MACHINE

TECHNICAL FIELD

The present disclosure is directed to a tracking system and method, and more particularly, to a system and method for tracking the tether of a mobile machine.

BACKGROUND

Large earthmoving equipment, for example drill rigs, front shovels, and excavators, are often tethered to receive electrical power from a stationary source via large, high-voltage cables connected to the equipment. The electric cables may lie across the ground of a worksite or along a bench floor during operation of the equipment. As the equipment moves to a new location, for example when the equipment travels to a new drilling site or pivots between drilling targets, the cables are dragged across the ground and the position of the cables changes relative to the ground.

Other pieces of non-tethered mobile equipment, some manned and some autonomous or semi-autonomous, are commonly co-located with the tethered machines at the worksite and navigate about the worksite performing other excavation and/or transportation activities. During operation of these other pieces of mobile equipment, contact with the aforementioned electric cables should be avoided so as to prevent damage to the electric cables and the equipment. However, mobility and navigation around the electric cables can be difficult because the cables may be hard to see and their locations do not always remain the same.

One system for supplying continuous electrical current to mobile equipment while protecting the associated power supply cable is described in U.S. Pat. No. 4,587,383 of Stoldt, issued May 6, 1986 ("the '383 patent"). The '383 patent discloses a large front-end loader that is electrically powered by way of a cable connected to a turret that is rotatably mounted on top of the machine. The turret has a height sufficient so that the flexible cable, as it enters the turret, is elevated above the highest fixed portion of the machine. In this manner, with the bucket of the loader in its lowered and working position, the machine has complete freedom of rotation and movement under the elevated cable, and the cable is kept off the mine floor where it might be damaged or create a safety hazard.

Although the system described in the '383 patent may help reduce damage to a cable caused by a machine that is tethered to the cable, the benefit thereof may be limited. That is, the system of the '383 patent may do little to protect the cable at locations away from the immediate vicinity of the tethered machine, where other machines may be operating that could damage the cable. In addition, the extended height of the turret may limit the use of the machine in some applications and/or increase the likelihood of damage to the machine caused by collision of the turret with overhead obstructions.

The tether tracking system and method of the present disclosure is directed toward improvements in the existing technology.

SUMMARY OF THE DISCLOSURE

One aspect of the present disclosure is directed to a tether tracking system. The tether tracking system may include a spool located on a mobile machine to selectively dispense and reel in a tether extending from the mobile machine to a stationary source as the mobile machine travels about a worksite. The tether tracking system may also include at least one sensor associated with the spool to generate a first signal indicative of a spool parameter, a locating system associated with the mobile machine to generate a second signal indicative of a travel path parameter of the mobile machine, and a controller in communication with the at least one sensor and the locating system. The controller may be configured to determine a tether avoidance zone based on the first and second signals.

Another aspect of the present disclosure is directed to an additional tether tracking system. This tether tracking system may include a spool located on a mobile machine to selectively dispense and reel in a tether extending from the mobile machine to a stationary source as the mobile machine travels about a worksite, and a motor associated with the spool to drive the spool during dispensing and reeling in of the tether. The tether tracking system may also include a sensor associated with the spool to generate a first signal indicative of a force applied to the spool by the tether, a locating system associated with the mobile machine to generate a second signal indicative of a travel path parameter of the mobile machine, and a controller in communication with the sensor and the locating system. The controller may be configured to determine a tether avoidance zone based on the first and second signals, to regulate operation of the motor based on the first signal, and to direct travel of the mobile machine through the tether zone during reeling in of the tether.

Yet another aspect of the present disclosure is directed to a method of tracking a tether of a mobile machine. The method may include sensing a parameter associated with a tether spool and responsively generating a first signal, and determining a travel path parameter of the mobile machine and responsively generating a second signal. The method may further include determining a tether avoidance zone based on the first and second signals.

DETAILED DESCRIPTION

Figure 1:
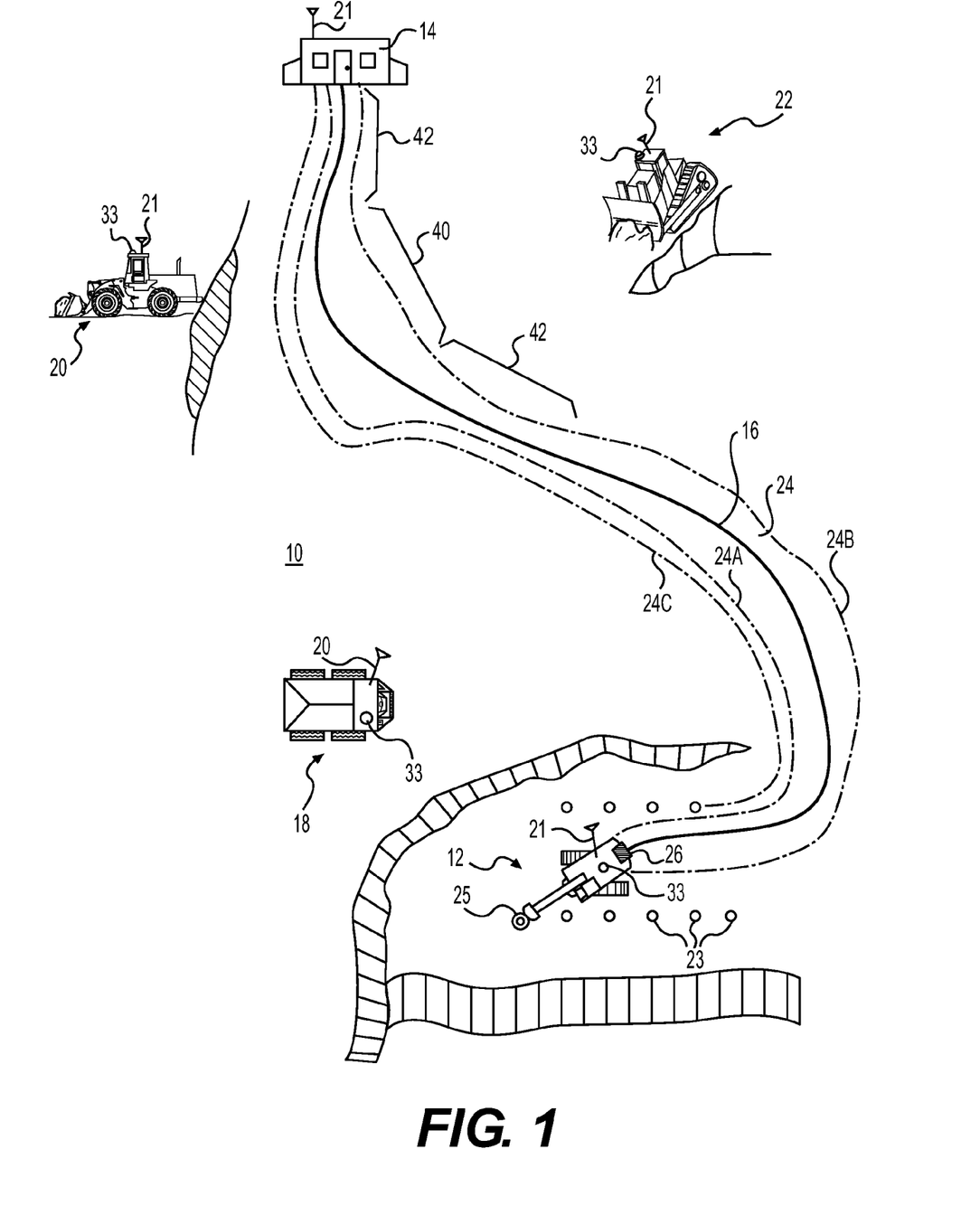
FIG. 1 is a diagrammatic illustration of an exemplary disclosed worksite having both tethered and non-tethered mobile machines.

FIG. 1 illustrates a worksite 10, for example a construction or mining site at which multiple machines are operable to perform various tasks. These tasks may include, in one example, earthmoving operations such as drilling, loading, hauling, grading, etc. It should be noted, however, that other tasks not associated with earthmoving may also be accomplished by the machines at worksite 10, if desired.

In the exemplary worksite 10 depicted in FIG. 1, some of the machines are shown as tethered machines, while others are shown as being non-tethered. In particular, a first machine depicted as a drill rig 12 is shown as being operatively connected to a base station 14 by way of a tether 16. A second machine, third machine, and fourth machine, depicted respectively as a haul truck 18, a wheel loader 20, and a dozer 22, are shown as being non-tethered. It is contemplated that any type of machine may be operable at worksite 10, and each machine may or may not be tethered. The type of machine tethered to base station 14 is not critical to this disclosure.

The machines operating at worksite 10 may be manually operated, autonomously operated, or semi-autonomously operated. That is, the operation of one or more of the machines may be completely regulated by an on- or off-board controller in response to environmental inputs and/or predetermined instructions, while other machines at worksite 10 may be completely regulated by a human operator. And still other machines, may have some functions regulated by a controller, and other functions regulated by a human operator. In any of these situations, each machine may be configured to communicate with each other, base station 14, and/or other entities at worksite 10 to receive and send information that can affect operation and control of the different machines.

Each of the machines at worksite 10 may convey information to each other and/or to base station 14 by way of a communication device 21 located on each machine and at base station 14. Communication device 21 may embody any mechanism that facilitates the exchange of data between the machines and base station 14. For example, communication device 21 may include hardware and/or software that enables each machine and base station 14 to send and/or receive data messages through a direct data link (not shown) or a wireless communication link. The wireless communications may include, for example, satellite, cellular, infrared, and any other type of wireless communications that enables the machines and base station 14 to wirelessly exchange information.

Regarding drill rig 12, tether 16 may be configured to supply drill rig 12 with elements that facilitate the performance of tasks assigned to drill rig 12. For example, tether 16 could embody an electric power supply cable that is configured to conduct a high-voltage current used by drill rig 12 for propulsion and/or for driving power of an associated work tool 25. In another example, tether 16 may alternatively or additionally be configured to supply a gas or a fluid, for example air, water, a slurry, etc., that facilitates a drilling operation, a cutting operation, a separating operation, a cleaning operation, or any other operation known in the art. In yet other examples, tether 16 could alternatively embody a solid winching cable or a rope used to retrieve or range limit drill rig 12, a communication line (e.g., a solid communication line or fiber optics) used to remotely communicate with and/or control operations of drill rig 12, or any other type of tether known in the art, if desired. In any of these scenarios, tether 16 may extend from base station 14, with base station 14 acting as a stationary source that supplies the electricity, air, water, slurry, range limiting, etc., to drill rig 12 (or to any other tethered machine at worksite 10).

In order to help ensure continued operation of drill rig 12 and to avoid damage to equipment at worksite 10, the machines operating at worksite 10, including drill rig 12 itself, should avoid inadvertent contact with tether 16. Specifically, the machines operating at worksite 10 should try to avoid driving over tether 16 or unintentionally engaging tether 16 with a work tool, a payload, or in any other way, as this engagement could cause a rupture of tether 16 and/or damage to the component that engages tether 16.

Unfortunately, because of the sizes of the machines operating at worksite 10 and/or because of terrain and other uncontrollable factors at worksite 10, the tether 16 of one machine may be difficult for an autonomous controller or a human operator of another machine to detect. For this purpose, an avoidance zone 24 may be established that provides one or more boundary areas in which tether 16 may or is most likely to exist. Avoidance zone 24 may include the actual or approximate location of tether 16, or may provide one or more areas to either side of tether 16 (a margin factor) that should be avoided by machines operating at worksite 10. As some machines may have the potential to cause more damage to or be damaged with greater severity by tether 16, it is contemplated that avoidance zone 24 may have different dimensions for each individual, class, or type of machine, and/or that a response to a machine entering avoidance zone 24 and/or encountering tether 16 may be different for each machine. Information regarding the location of tether 16 and/or avoidance zone 24 may be communicated to each machine via communication device 21 and used to automatically and/or manually direct the machines clear of avoidance zone 24 during normal operations.

In one example, avoidance zone 24 may be wider for wheel loader 20 than it would be for dozer 22 because of the relatively higher speeds at which wheel loader 20 may travel. In another example, avoidance zone 24 may be even wider for haul truck 18 because of the heavy payload of haul truck 18 when fully loaded and the associated potential for damage to tether 16 caused by the weight.

In yet another example, avoidance zone 24 may include only a single set of boundary positions for one machine, and multiple sets of boundary positions for another machine. In this scenario, each set of boundary positions may correspond with different responses that are initiated when the positions of each boundary set are breached by a machine. For example, when wheel loader 20 encounters a boundary position 24C, wheel loader 20 may be advised and/or directed to follow a path that leads wheel loader 20 away from avoidance zone 24. In this same example, when wheel loader 20 encounters an inner boundary position 24A, wheel loader 20 may be inhibited from further travel into avoidance zone 24 (e.g., wheel loader 20 may be shut down or restricted to only reverse travel out of avoidance zone 24). In contrast, haul truck 18 may be immediately shut down upon the breaching of a single boundary position of avoidance zone 24. It should be noted that the number of boundary sets and the symmetry of boundary positions relative to tether 16 are not limited by this disclosure. It is also contemplated that different responses may be issued in reaction to a proximity of a machine to avoidance zone 24, a boundary of avoidance zone being crossed, and/or a distance into avoidance zone that a machine has driven.

Figure 2:
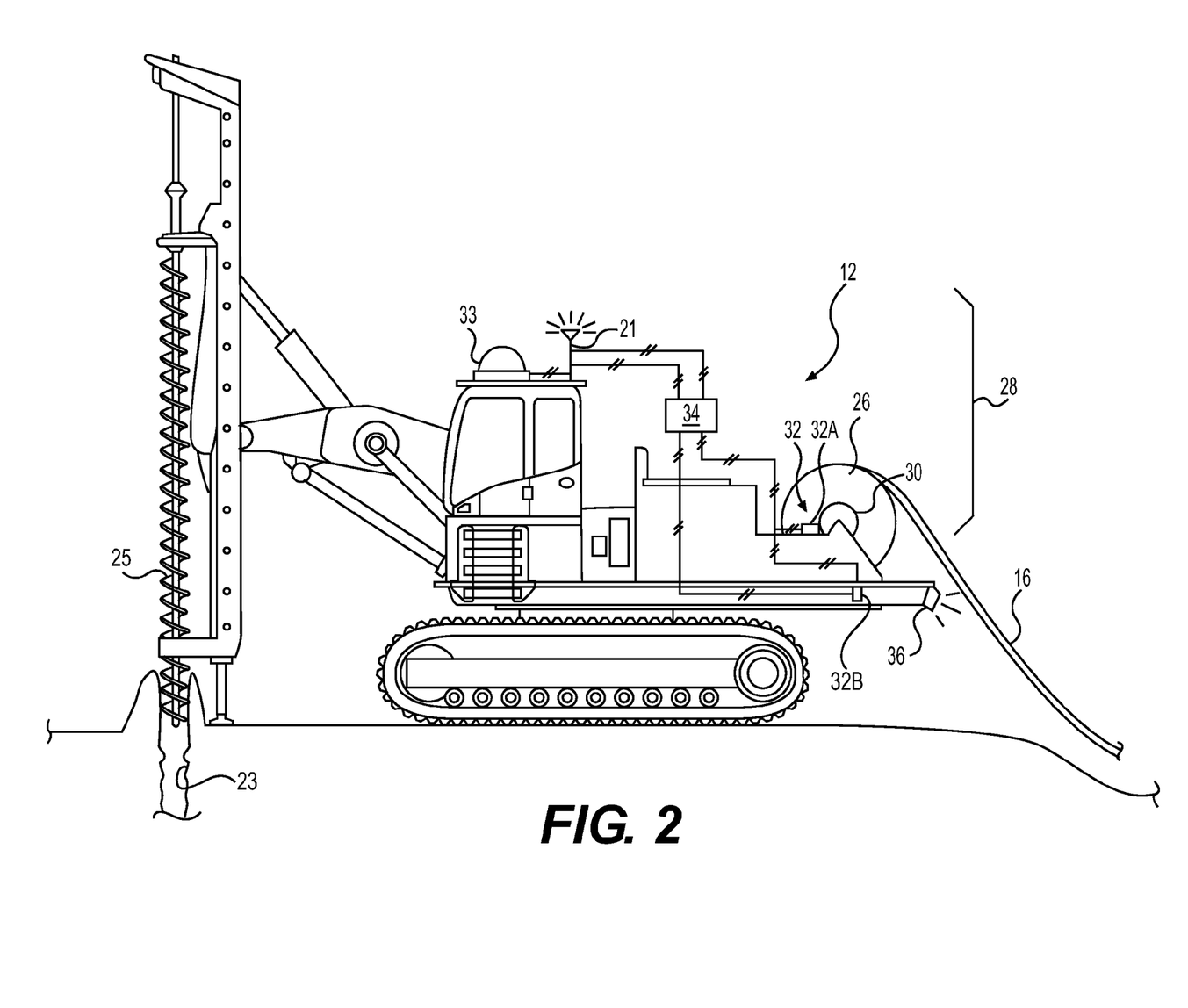
FIG. 2 is a diagrammatic illustration of a tether tracking system that may be used at the worksite of FIG. 1.

As illustrated in FIG. 2, tether 16 may connect to drill rig 12 at an end opposite work tool 25. In one embodiment, tether 16 may connect to a spool 26 that is rotatably mounted to drill rig 12 at a back end thereof. Spool 26 may be configured to dispense and reel in tether 16 as drill rig 12 moves away from or toward base station 14, respectively. It is contemplated that one or more centrally-located guides (not shown) may be associated with spool 26, if desired, to promote smooth winding of tether 16 about spool 26.

Drill rig 12 may be equipped with a tether tracking system ("system") 28 that regulates the operation of spool 26 and tracks the location of tether 16 in response to one or more inputs. System 28 may include, among other things, a motor 30 connected to drive spool 26, one or more sensors 32 associated with operation of spool 26, a locating system 33, and a controller 34 in communication with motor 30, the one or more sensors 32, and locating system 33. As will be described in more detail below, controller 34 may regulate operation of motor 30 to dispense and/or reel in tether 16 according to preprogrammed instructions and based on signals received from the one or more sensors 32 and/or locating system 33.

Motor 30 may be any type of electric or hydraulic motor known in the art that is operable to drive rotation of spool 26 in clockwise and counterclockwise directions in response to input from controller 34. It is contemplated that multiple motors 30 may be utilized to cooperatively drive spool 26, if desired. Motor 30 may be connected to spool 26 directly, or indirectly by way of a gear arrangement (not shown), a ratchet mechanism (not shown), a pulley system (not shown), or in any other manner. Motor 30 may be controlled to selectively vary a rotational direction, a speed, and/or a torque output applied to spool 26.

The one or more sensors 32 may be situated to monitor a parameter of spool 26 and to responsively generate one or more signals indicative of the parameter. For example, one sensor 32 could embody a rotation sensor 32A configured to monitor the rotational direction, speed, and/or torque output applied by motor 30 and/or tether 16 to spool 26. Alternatively or additionally, another sensor 32 could embody a load cell 32B associated with a mounting bracket of spool 26 that is configured to monitor a force applied to spool 26 by motor 30 and/or by tether 16 (i.e., sensor 32B may monitor a torque acting on spool 26 and/or a tension of tether 16 as it is transmitted through spool 26 and the mounting bracket to a frame of drill rig 12). The one or more sensors 32 may generate signals indicative of these monitored parameters, and communicate the signals to controller 34.

Locating system 33 may embody an electronic receiver configured to communicate with one or more satellites or a local radio or laser transmitting system to determine travel path parameters of drill rig 12. As used herein, a travel path parameter may include a relative location, heading, travel speed, and/or pivoting of drill rig 12. In these embodiments, locating system 33 may receive and analyze high-frequency, low power radio or laser signals from multiple locations to triangulate a relative 3-D location. Alternatively, locating system 33 may embody an Inertial Reference Unit (IRU) operable to receive or determine locational information associated with drill rig 12. In yet another configuration, a group of one or more existing onboard sensors such as a travel speed sensor, a steering sensor, an odometer, etc., may together embody locating system 33 and be used to generate information regarding the travel path parameters of drill rig 12, if desired. A signal indicative of one or more of the travel path parameters may then be communicated from locating system 33 to controller 34, or alternatively, locating system 33 may be part of controller 34.

Controller 34 may include any device capable of monitoring, recording, storing, indexing, processing, and/or communicating the spool parameters from the one or more sensors 32 and the travel path parameters of drill rig 12 from locating system 33, for controlling operations of motor 30, and for determining an approximate or actual location of tether 16 and calculating the boundary area(s) of avoidance zone 24 in response to this information. These devices may include, for example, a memory, one or more data storage devices, a central processing unit, or any other components that may be used to run the disclosed application. Furthermore, although aspects of the present disclosure may be described generally as being stored within memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Controller 34 may be configured to regulate performance of motor 30 during dispensing and reeling-in operations to control parameters of spool 26 and/or tether 16 such as dispensed length (i.e., a length of tether dispensed during travel of drill rig 12 away from base station 14), dispensing speed (i.e., a rotational speed of spool 26 times a diameter of tether 16 on spool 26), dispensing force (i.e., a torque output of motor 30), tether tension (i.e., a tensile or compressive force acting on tether 16 as a result of gravity and the movement of drill rig 12), and tether location. In particular, it may be desirable for the location of the dispensed tether 16 to remain substantially unchanged during operation of drill rig 12 such that the associated avoidance zone 24 may also remain unchanged and predictable by other machines and/or operators at worksite 10. For this reason, it may be undesirable to significantly move tether 16 relative to the ground during dispensing and reeling-in operations and/or during travel or pivoting of drill rig 12 (i.e., it may be undesirable to drag or push tether 16 across the ground). Tether 16 may move relative to the ground if it is dispensed at a rate that does not substantially match a travel or pivot speed of drill rig 12. For example, if drill rig 12 is moving or pivoting at a first speed, but tether 16 is being dispensed at a rate slower than that speed, the portion of tether 16 that is laying on the ground at worksite 10 may be dragged behind drill rig 12 and exert significant tensile forces on spool 26 because of the difference in speeds. Similarly, if tether 16 is being dispensed at a rate faster than the travel or pivot speed of drill rig 12, the rotation of spool 26 may actually cause tether 16 to be pushed along the ground away from drill rig 12 and exert significant compressive forces on spool 26 because of the difference in speeds. Similar conditions may exist during reeling in of tether 16.

However, if tether 16 can be dispensed or reeled in at about the same rate as the travel or pivot speed of drill rig 12, tether 16 may be laid down on the ground and picked back up from the ground without substantial relative movement between tether 16 and the ground and without substantial forces being exerted on spool 26 by tether 16. For this reason, controller 34 may communicate with motor 30 to vary a spooling direction, speed, and/or torque applied by motor 30 to spool 26 during the dispensing and reeling in of tether 16 based on input from the one or more sensors 32 and/or locating system 33 to reduce the difference in speeds and the resultant forces acting on spool 26. For example, controller 34 may control motor 30 to dispense and/or reel in tether 16 at a rate that substantially matches the travel or pivot speed of drill rig 12 as measured by locating system 33. In another example, controller 34 may control motor 30 to dispense and/or reel in tether 16 based on the force measurements provided by the one or more sensors 32 such that the spool speed (dispensing and/or reeling in speed) is indirectly controlled to match the travel speed and pivoting of drill rig 12. In yet another example, motor 30 may be controlled based on a combination of travel speed input and force input, if desired. The net force acting on spool 26 (the sum of forces applied by tether 16 and motor 30 to spool 26) and the difference in dispensing and travel speeds should be minimized.

Controller 34 may be further configured to determine a location of tether 16 based on known kinematics of drill rig 12 and on signals from the one or more sensors 32 and locating system 33. Specifically, based on one or more travel path parameters provided by locating system 33 and based on the fixed position and/or dimensions of spool 26 on drill rig 12, controller 34 may be configured to determine a trajectory (i.e., a history of movements) of spool 26 about worksite 12. And based on the assumption that tether 16 is laid down on the ground and picked back up by spool 26 at a known location near spool 26 at the rear of drill rig 12 during this travel with little or no relative movement between tether 16 and the ground (and/or based directly on forces measured at spool 26 by the one or more sensors 32 that are indicative of relative movement between tether 16 and the ground), an approximate location of tether 16 can be accurately calculated by controller 34 according to one or more internal and/or preprogrammed algorithms.

In some situations, however, it may be difficult to lay down and pick up tether 16 without any movement of tether 16 relative to the ground. For this reason, in some examples, system 28 may be provided with one or more additional sensors 36 used to selectively and/or periodically identify and/or confirm the approximated location of tether 16. Sensor 36 may be configured to detect an actual position of tether 16 continuously, upon command, or after a period of operational time has elapsed, for example every thirty seconds, two minutes, or another calibrated time period. Sensor 36 may be requested by controller 34 to survey the actual location of tether 16 when a likelihood of tether movement relative to the ground is greater than a threshold amount, or alternatively, in response to avoidance zone 24 having been breached by another machine at worksite 10. It may be likely that tether 16 has moved relative to the ground, for example, when drill rig 12 experiences a sudden or excessive change in travel direction or speed, a sensor malfunction, a communication malfunction, or other similar condition. Controller 34 may then compare the actual location of tether 16 to the approximate location of tether 16, and calibrate the approximate location accordingly. It is contemplated that a manual survey of tether 16 may also or alternatively be requested by controller 34, if desired.

Sensor 36 may be positioned on drill rig 12 so as to have a sufficient field of view to monitor movement of tether 16 during travel of drill rig 12, for example at a location facing rearward from drill rig 12. Sensor 36 may embody, for example, a radar sensor, a scanning laser sensor, an ultrasonic sensor, an infrared sensor, or an optical sensor, such as a range-finding camera. In addition, sensor 36 may employ any combination of the above technologies, if desired, to enhance its capability for detecting the actual location of tether 16.

During operation of drill rig 12, tether 16 may shift positions within a loosely defined area behind drill rig 12. For this reason, sensor 36 may periodically scan the area behind drill rig 12 and identify actual tether positions during operation of drill rig 12, particularly during travel or pivoting of drill rig 12. These actual positions may be accounted for by applying a margin factor to the approximated position of tether 16. The tether avoidance zone 24 including a margin factor is shown in FIG. 1 with the first boundary position 24A, a second boundary position 24B, and the third boundary position 24C. Controller 34 may be configured to generate a position data set based on actual tether positions, this data set being used to calculate and/or confirm avoidance zone 24 described above according to preprogrammed algorithms and sets of instructions. In other words, controller 34 may be able to determine avoidance zone 24 based on the approximate location of tether 16 and based on a margin factor that accounts for some deviation of the approximate position from the actual position of tether 16. The margin factor may be a predetermined default value, may be derived from observations made by sensor 36, or may be received from or calculated by another source.

Controller 34 may further adjust the dimensions of avoidance zone 24 along the length of tether 16 based on factors affecting calculation accuracy. For example, when avoidance zone 24 is calculated based on a measured parameter indicative of a spool torque or of a tether tension that exceeds a threshold amount associated with undesired movement of tether 16; when calculated based on information from a malfunctioning sensor 32A and/or 32B, locating system 33, and/or sensor 36; when calculated during an excessive speed and/or direction change of drill rig 12; and/or when calculated based on other similar conditions, the accuracy of the resulting tether location approximation may be less than desired. In these situations, controller 34 may increase the width dimension between first and second boundary positions 24A and 24B of avoidance zone 24 (i.e., controller 34 may increase the margin factor applied to the approximate tether position to determine avoidance zone 24) such that the likelihood of tether 16 being located within avoidance zone 24 may be increased. This scenario may be exemplified in FIG. 1 by the portion of avoidance zone 24 labeled as section 40.

In contrast, when drill rig 12 is traveling in a substantially constant heading without pivoting and/or at a substantially constant speed, when the parameter measured by the one or more sensors 32 is indicative of a low spool torque and/or tether tension, and/or when all sensing devices of system 28 are functioning correctly, the width dimension between first and second boundary positions 24A and 24B beyond the approximated tether position (i.e., the margin factor applied to the approximated tether position) may be reduced or even eliminated to thereby reduce the area consumed by avoidance zone 24 (i.e., to reduce the area at worksite 10 that should be avoided). This scenario may be exemplified in FIG. 1 by the portions of avoidance zone 24 labeled as section 42. In this manner, by steering clear of avoidance zone 24, undesired collisions with tether 16 may be reduced, while simultaneously keeping the area of avoidance zone 24 as small as possible.

During the calculation of avoidance zone 24, the margin factor may be increased at a predetermined distance along the length of tether 16 before the location corresponding to detection of the accuracy-affecting factor such that avoidance zone 24 widens at a location of known accuracy by an appropriate amount. Similarly, the margin factor may be decreased at a predetermined distance along the length of tether 16 after the location corresponding to detection of the accuracy-affecting factor such that avoidance zone 24 narrows back to its original dimension (or to another dimension based on current conditions of drill rig 12) at a location of known accuracy. In this manner, the location corresponding to detection of the accuracy-affecting factor may be safely encapsulated by a section of avoidance zone 24 having an increased dimension. The predetermined distances of widening and narrowing of avoidance zone 24 before and after the location corresponding to detection of the accuracy-affecting factor, respectively, may vary based on which machine tether 16 is connected to, which machine is receiving tether and/or avoidance zone location information, and other machine and/or site based parameters.

For example, if at a position 50 feet from base station 14, sensor 32 suddenly begins to malfunction (or another accuracy-affecting factor is detected) and continues to malfunction while drill rig 12 travels another 10 feet away from base station 14, avoidance zone 24 may be calculated to have a larger width dimension from a location of 40 feet to a location of 70 feet from base station 14. In this manner, the likelihood of tether 16 residing within avoidance zone 24 along its entire length may be increased. It should be noted that any strategy for determining the starting and stopping points of increased tether avoidance zone dimension based on accuracy-affecting factors may be utilized. It is also contemplated that any strategy for transitioning between changing dimensions such as step-wise transitioning, linear transitioning, and non-linear transitioning may also be utilized.

The approximate location of tether 16 (i.e., the saved travel path parameters) and/or avoidance zone 24 may additionally be utilized by drill rig 12 as a guide during reverse travel while tether 16 is being reeled in. Specifically, avoidance zone 24, as determined by controller 34, may be utilized to control travel of drill rig 12 in a direction towards base station 14 after completion of its assigned tasks. For example, after drilling a number of holes 23 (referring to FIG. 1), drill rig 12 may be commanded to return to base station 14 in preparation for a subsequent blasting event. During the drilling of holes 23, piles of debris removed from holes 23 may be left around the respective perimeters of holes 23. If left unchecked, reverse travel of drill rig 12 other than in the original forward path taken to get to holes 23, could result in tether 16 being dragged across or against the piles of debris, thereby pushing debris back into holes 23. By controlling drill rig 12 to travel in the reverse path through avoidance zone 24 back to base station 14, while simultaneously reeling in tether 16, tether 16 may be prevented from undesired engagements with the debris, thereby helping to maintain the integrity of holes 23. Drill rig 12 may be directed by controller 34 for autonomous or manual control to follow the reverse path lying within avoidance zone 24. That is, controller 34 may directly control the travel of drill rig 12 according to the boundaries of avoidance zone 24 or, alternatively, provide visual and/or audible directions to a human operator that facilitate manually-controlled travel within avoidance zone 24 along the original travel path. In some embodiments, the locations of holes 23, the corresponding debris, and/or other obstacles at worksite 10 may also be detected, monitored, mapped, and/or communicated from drill rig 12 to other machines and/or base station 14 at worksite 10, if desired.

It is contemplated that avoidance zone 24 may be generated by the controller located onboard each tethered machine itself (e.g., by controller 34 onboard drill rig 12), by the controllers of other machines at worksite 10, and/or by a central controller (not shown) located, for example, at base station 14. In particular, it may be possible for controller 34 of drill rig 12 to communicate to other machines only the approximate and/or actual locations of tether 16, if desired. In this situation, the controllers of each of the other machines operating at worksite 10 may independently generate its own avoidance zone about tether 16 that is based on the location of tether 16 and factors unique to each machine such as travel speed, size, weight, traction type, damage risk, etc. Alternatively, the central controller could receive tether location information from each tethered machine at worksite 10, and responsively generate a collective worksite map showing all avoidance zones. In this situation, the central controller could customize the map information sent to each machine based on the unique characteristics of each machine.

Figure 3:
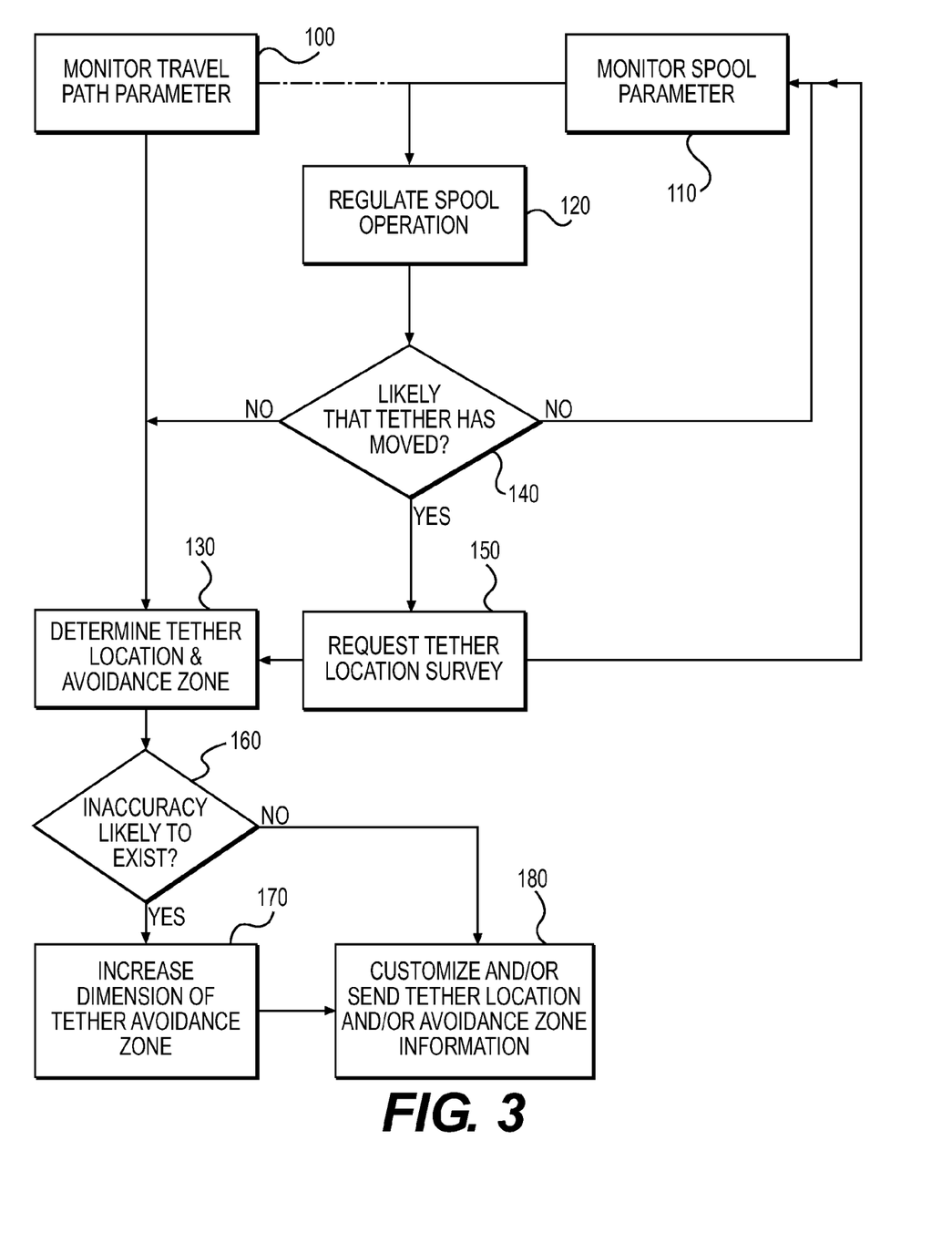
FIG. 3 is a flowchart depicting an exemplary disclosed method that may be performed by the tether tracking system of FIG. 2.

FIG. 3 illustrates an exemplary method that may be performed by tether tracking system 28. FIG. 3 will be discussed in more detail in the follow section to further illustrate the disclosed control system and its operation.

INDUSTRIAL APPLICABILITY

The disclosed tether tracking system finds potential application in any worksite employing a tethered mobile machine. The disclosed system may help to reduce damage to the tether of the machine by generating an avoidance zone about the tether that should be avoided by all machines operating at the worksite. The disclosed system may also help guide the tethered machine back to a base station by directing the machine in a path through the avoidance zone established for its own tether. Operation of system 28 will now be explained with reference to FIGS. 1 and 3.

During initial operation at worksite 10, tethered drill rig 12 may depart base station 14 in a heading towards an area of intended blasting where holes 23 may be drilled in preparation for the blasting. As drill rig 12 leaves base station 14, drill rig 12 may head in a substantially constant direction and at a substantially constant speed. During this time, controller 34 may monitor the torque applied to spool 26 by tether 16, the tension of tether 16, and/or the travel path parameters of drill rig 12 (Steps 100, 110), and responsively regulate motor 30 and spool 26 to dispense tether 16 at a speed that substantially matches the travel speed and pivot movement of drill rig 12 and/or with a torque that reduces the net force acting on spool 26 (Step 120). That is, a tether dispensing rate may be directly controlled to substantially match the travel speed and pivot movement of drill rig 12 such that the net force acting on spool 26 is maintained at about zero, or alternatively, the net force on spool 26 may be maintained at about zero such that the tether dispensing rate substantially matches the travel speed of drill rig 12.

During operation of drill rig 12 at section 42, controller 34 may approximate the location of tether 16 based on travel path parameters provided by locating system 33 and on spool parameter information provided by the one or more sensors 32. And based on the approximate location of tether 16 and the margin factors described above, controller 34 may determine the size and location of avoidance zone 24 (Step 130). If the travel speed substantially matches the tether dispensing rate at section 42 and if the net force acting on spool 26 is relatively low, it may be determined that tether 16 was laid down on the ground surface of worksite 10 with little or no relative movement between the ground and tether 16 (Step 140: No). As such, the margin factor applied to the approximate location of tether 16 may be relatively smaller, making that section (section 42) of tether avoidance zone 24 relatively smaller.

However, if the travel speed does not substantially match the tether dispensing rate at section 42 and if the net force acting on spool 26 is relatively high, it may be determined that tether 16 was moved relative to the ground surface as it was laid down (Step 140: Yes). At this and/or other points in time, controller 34 may request a survey of the actual tether location by sensor 36 to compare with the approximate location of tether 16 (Step 150). Based on the comparison, controller 34 may adjust the determined tether location and/or the size and location of tether avoidance zone 24 (Step 130).

As drill rig 12 continues travel towards the intended drill site, drill rig 12 may traverse section 40 and experience changes in direction, changes in speed, changes in terrain, sensor or system malfunctions, and/or other conditions affecting accuracy of the tether location calculation. If these conditions are detected (Step 160: Yes), controller 34 may adjust a distance between first and second boundary positions 24A and 24B (i.e., controller 34 may apply a larger margin factor to determine avoidance zone 24) to increase the likelihood that tether 16 is located safely within avoidance zone 24 (Step 170). Such an application of a larger margin factor may be applied to one or both sides of the approximate tether position.

Information regarding the approximate location of tether 16 and/or the determined first and second boundary positions 24A, 24B of avoidance zone 24 may be sent to the other machines operating at worksite 10 and/or to base station 14 (Step 180). And based on this information, the machines operating at worksite 10 may be directed to avoid tether 16.

After drill rig 12 reaches the intended drill site and creates holes 23, drill rig 12 may be required to return towards base station 14 in advance of blasting. At this time, drill rig 12 may be autonomously or manually directed to retrace its original travel path through avoidance zone 24 back to base station 14 while reeling in tether 16. By retracing its original travel path while reeling in tether 16, the likelihood of tether 16 pushing debris into holes 23 may be reduced.

It will be apparent to those skilled in the art that various modifications and variations can be made to the tether tracking system and method of the present disclosure without departing from the scope of the disclosure. For example, while tether avoidance zone 24 has been described as a function of an approximate tether position, it is understood that tether avoidance zone 24 could be determined directly based on sensed parameters without first determining an approximate tether position, if desired. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A tether tracking system, comprising:
    a spool located on a mobile machine to selectively dispense and reel in a tether extending from the mobile machine to a stationary source as the mobile machine travels about a worksite;
    at least one sensor associated with the spool to generate a first signal indicative of a spool parameter;
    a locating system associated with the mobile machine to generate a second signal indicative of a travel path parameter of the mobile machine; and
    a controller in communication with the at least one sensor and the locating system, the controller being configured to determine a tether avoidance zone based on the first and second signals.

2. The tether tracking system of claim 1, wherein:
    the tether avoidance zone is based on an approximate location of the tether determined based on the first and second signals; and
    the controller is further configured to send information regarding at least one of the approximate tether location and the avoidance zone to other mobile machines co-located at the worksite.

3. The tether tracking system of claim 2, wherein the avoidance zone changes dimension based on a type of the other mobile machines receiving the information.

4. The tether tracking system of claim 1, wherein the at least one sensor is configured to sense a spool parameter indicative of one of a tether tension or a spool torque.

5. The tether tracking system of claim 1, further including an additional sensor configured to detect an actual location of the tether on the ground, wherein the controller is in communication with the additional sensor and configured to selectively compare an approximate location of the tether with the detected location, and calibrate the approximate location based on the comparison.

6. The tether tracking system of claim 1, wherein the controller is further configured to:
    determine that a portion of the tether on the ground may have been moved relative to the ground based on the first signal; and
    responsively request a survey of the actual tether location.

7. The tether tracking system of claim 1, wherein the controller is configured to increase a size of the avoidance zone at locations along a length of the tether where the mobile machine experiences a change in at least one of a heading and a travel speed.

8. The tether tracking system of claim 1, wherein the controller is further configured to:
    detect a malfunction of the at least one sensor or the locating system; and
    increase a dimension of the avoidance zone based on the detection.

9. The tether tracking system of claim 1, wherein the controller is further configured to direct travel of the mobile machine through the avoidance zone during reeling in of the tether.

10. The tether tracking system of claim 1, wherein the controller is further configured to adjust a tension of the tether based on at least one of travel of the mobile machine and the first signal.

11. A method of tracking a tether of a mobile machine, comprising:
    sensing a parameter associated with a tether spool and responsively generating a first signal;
    determining a travel path parameter of the mobile machine and responsively generating a second signal; and
    determining a tether avoidance zone based on the first and second signals.

12. The method of claim 11, wherein sensing a parameter associated with the tether spool includes sensing a parameter indicative of at least one of a tether tension and a spool torque.

13. The method of claim 11, further including:
    determining an approximate tether location based on the first and second signals; and
    sending information regarding at least one of the approximate tether location and the tether avoidance zone to other mobile machines at a common worksite.

14. The method of claim 13, further including changing a dimension of the tether avoidance zone based on a type of the other mobile machines receiving the information.

15. The method of claim 11, further including:
    determining that a portion of the tether on the ground has moved relative to the ground based on the first signal; and
    responsively requesting a survey of the actual tether location.

16. The method of claim 11, further including increasing a dimension of the tether avoidance zone at locations along the length of the tether where the mobile machine experiences a change in at least one of a heading and a travel speed.

17. The method of claim 11, further including:
    detecting a system malfunction; and
    increasing a dimension of the tether avoidance zone based on the detection.

18. The method of claim 11, further including directing travel of the mobile machine through the tether avoidance zone during reeling in of the tether.

19. The method of claim 11, further including adjusting a tension of the tether based on at least one of travel of the mobile machine and the first signal.

20. A tether tracking system, comprising:
    a spool located on a mobile machine to selectively dispense and reel in a tether extending from the mobile machine to a stationary source as the mobile machine travels about a worksite;
    a motor associated with the spool to drive the spool during dispensing and reeling in of the tether;
    a sensor associated with the spool to generate a first signal indicative of a force applied to the spool;
    a locating system associated with the mobile machine to generate a second signal indicative of a travel path parameter of the mobile machine; and
    a controller in communication with the sensor and the locating system, the controller being configured to:
    determine a tether avoidance zone based on the first and second signals;
    regulate operation of the motor based on the first signal; and
    direct travel of the mobile machine through the tether avoidance zone during reeling in of the tether.

* * * * *